A. SMITH.
REVERSIBLE SIDEHILL PLOW.
APPLICATION FILED OCT. 23, 1915.
1,183,686.
Patented May 16, 1916.
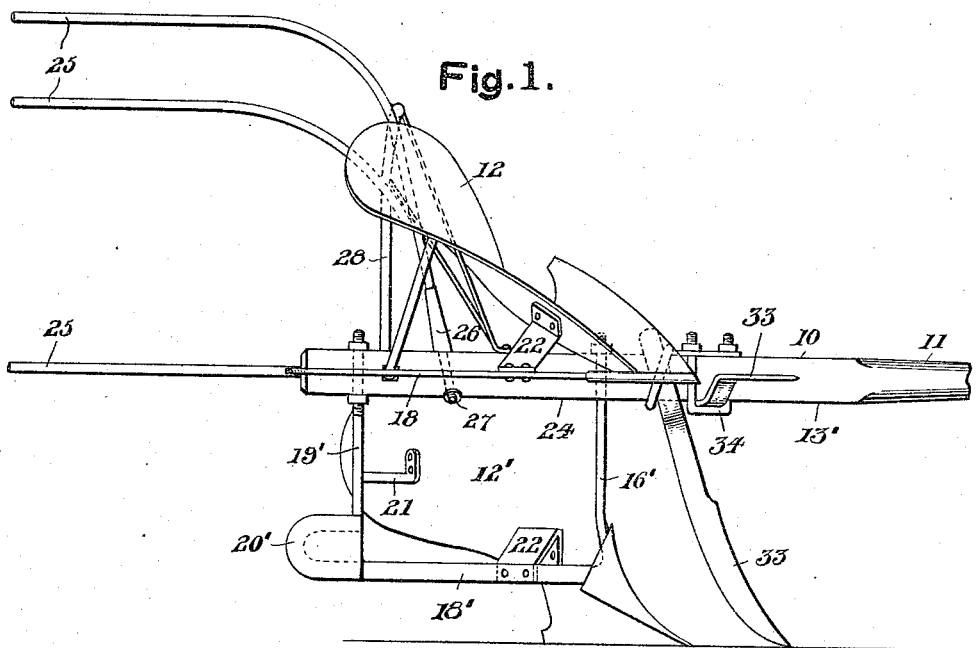
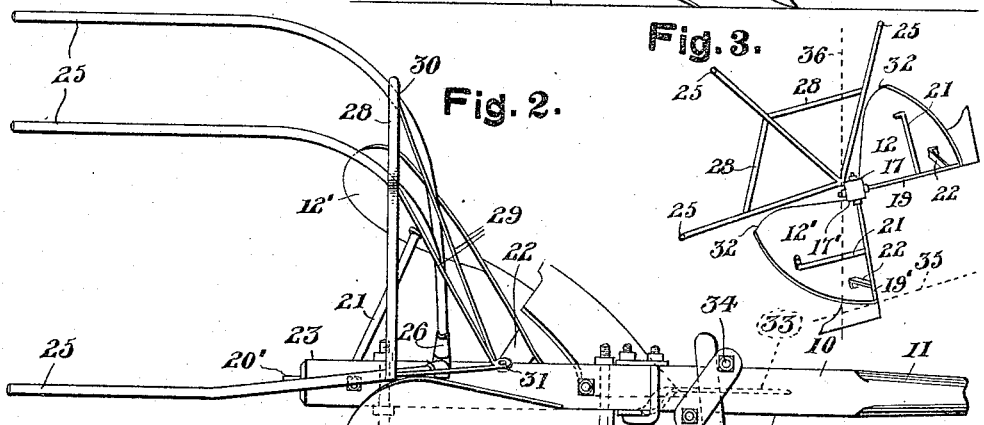
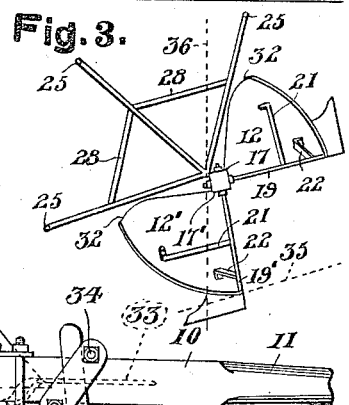
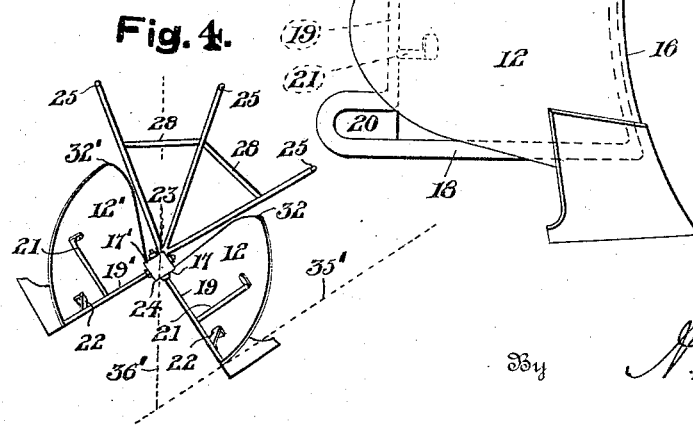
Inventor
A. Smith
By N. M. Wilson
Attorney

UNITED STATES PATENT OFFICE.

ANDY SMITH, OF WADSWORTH, OHIO.

REVERSIBLE SIDEHILL-PLOW.

1,183,686.  Specification of Letters Patent.  Patented May 16, 1916.

Application filed October 23, 1915. Serial No. 57,481.

*To all whom it may concern:*

Be it known that I, ANDY SMITH, subject of the King of Hungary, residing at Wadsworth, in the county of Medina and State of Ohio, have invented certain new and useful Improvements in Reversible Sidehill-Plows, of which the following is a specification.

This invention relates to certain new and useful improvements in reversible side hill plows.

The primary object of the invention is to provide a plow construction especially adapted for side-hill plowing and being so constructed that the plow handles are conveniently positioned horizontally when the earth-engaging members are operatively positioned.

A further object of the invention is to provide a plow device provided with two sets of earth-furrowing members having serviceable plow-handles, a separate one of said furrowing members and pair of handles being arranged for use while plowing in different directions upon a side hill.

A still further object of the invention is to provide a plowing device adapted for advantageous side hill plowing and so arranged as to turn a furrow with one moldboard when traveling in one direction and readily shiftable for utilizing a separate mold board for turning the furrow during the return travel.

In accomplishing these results, it is designed to mount upon a plow beam, two furrow turning members of preferred construction at perpendicular relations with respect to each other and to provide a tri-handle arrangement upon the beam intermediate the said furrow members, and arranged in such a manner as to position a pair of handles substantially horizontally to be readily grasped by the operator when the required furrow member is operatively positioned upon the inclined earth surface during the operation thereof, in either direction of travel.

In the drawings forming a part of this application and in which like-designating characters refer to corresponding parts throughout the several views:—Figure 1 is a side elevation of the device positioned upon a level foundation and with the pole portion of the beam broken away. Fig. 2 is a side elevational view from the mold board side of the plow. Fig. 3 is a reduced detail rear elevational view of the device illustrated in its operative position upon a side hill, and Fig. 4 is a similar view with the device operatively positioned for turning an up-hill furrow.

The embodiment of the invention as herein illustrated provides a plow beam 10 substantially square in cross-section and having a forwardly extending cylindrical end 11 forming the pole of the plow, while upon the said beam 10, two identical furrow turning members are provided of special novel construction arranged in perpendicular relations to each other and attached to adjacent sides of the beam 10 to provide separate mold boards 12 and 12'. The said furrow members have their mold boards 12 and 12' provided with laterally-extending forwardly positioned ribs 16 and 16' respectively having their upper ends extending through the said beam 10 in perpendicularly-arranged planes for securing the mold boards 12 and 12' in edgewise engagement projecting from adjacent faces 17 and 17' thereof. Land-sides or runners 18 and 18' extend from the forward edge of the mold board to the rear securing posts 19 and 19' respectively which are integral extensions of the said runners and are positioned substantially parallel to the shin 16 and standard 16' respectively and extend through the said beam 10 in planes perpendicular to each other. Directing rudders 20 and 20' are carried at the rear ends of the said runners 18 and 18' respectively, while braces 21 and 22 are connected between the said mold boards and their rear posts and runners respectively.

The rear posts 19 and 19' as well as the forward standards 16 and 16' of the two furrow turning members being arranged in perpendicular planes as best shown in Fig. 3 of the drawings, it will be evident that whenever one of the furrow turning members is operatively or substantially vertically positioned, the other one will be inoperatively elevated or disposed substantially horizontal.

The furrowing members being thus positioned upon the adjacent faces 17 and 17' of the plow beam 10, a universal arrangement of tri-handles are rigidly mounted between the spaced mold boards 12 and 12' thereof secured to the longitudinal upper edge 23 of the beam which is diagonally disposed with respect to the lower longitudinal edge 24 thereof lying centrally intermediate the respective rear posts and front ribs of the two furrow members. The tri-handles consist of three curved rearwardly projecting handles 25 equally spaced apart and secured together in a common forward base 26 rigidly attached to the said beam edge 23 by a projecting bolt 27 protruding through the said opposite edge 24 of the beam. A connecting bow 28 spans the forward ends of the handles 25 for retaining the same in their spaced relations, while strut wires 29 connect the points of attachment 30 of the said bow and handles with a ring 31 which is rigidly secured to the edge 23 of the beam slightly forwardly of the handle base 26. The tri-handle arrangement being positioned intermediate the mold boards 12 and 12′, the outer ones of the said three handles 25 are positioned slightly spaced equal distances from the extreme outer edges 32 and 32′ of the mold boards 12 and 12′ respectively. Colters 33 may also be secured to the beam 10 in any desired manner as by means of suitable clamps 34 and projecting in advance of the mold board standards 16 and 16′ of the furrowing members.

In operation, in plowing upon a side hill, the position of the device is best illustrated in Fig. 3 of the drawings in which the sloping surface of the ground is diagrammatically indicated by the dotted line 35. In plowing forwardly in either direction, that earth-turning mold board 12 or 12′ will be employed which will properly turn the furrow, down-hill or in other words, in traveling in one direction, the mold board 12 will engage the sloping earth surface 35 as illustrated in Fig. 3, the same turning a left-hand furrow downhill, or at the lower side of the plow, while during the return travel of the plow, the other or right-hand mold board 12 will be employed which in a similar manner will turn the furrow downhill. It will be also seen by referring to Fig. 3 that although the outer ones of the handles 25 lie in substantially the same planes as the rear posts 19 and 19′ of the oppositely arranged mold boards, two of the said handles 25 including the central one and one of the outer ones thereof, will be arranged substantially horizontal during either of the above-described operative paths of travel of the device, so that with the operator walking upright upon the inclined surface of the ground 35 as represented by the vertical dotted lines 36 in Fig. 3, will have a pair of operating handles conveniently positioned for grasping and guiding the plow in whichever direction the same is moving. In Fig. 4 the device is shown with the board 12 positioned for turning an up-hill furrow upon the ground 35′, the operative position being shown at 36′.

A serviceable plow is thus provided convertible for accommodating itself to hill side plowing in either direction and one also that is exceedingly strong in its construction.

While the form of the invention herein shown and described is what is believed to be the preferred embodiment thereof, it is nevertheless to be understood that minor changes may be made therein without departing from the spirit and scope of the invention as claimed.

What I claim as new is:—

A plow comprising a beam, a mold board, a standard arranged adjacent the forward edge thereof and provided with an upper extension secured to the said beam, a post secured to the rear end of the said beam and having a curved rear extension at its lower end continued in a forwardly extending supporting runner having its front end terminating adjacent to the lower end of the said standard, a rudder carried by the said curved extension, an arm connected between the said post and substantially the central point of the said mold-board, and a connecting brace between the said runner and mold-board.

In testimony whereof I affix my signature.

ANDY SMITH.